April 19, 1932.  S. B. HEATH  1,854,405
PREPARATION OF A MIXED CALCIUM CHLORIDE-CALCIUM CHLORATE PRODUCT
Filed March 7, 1930
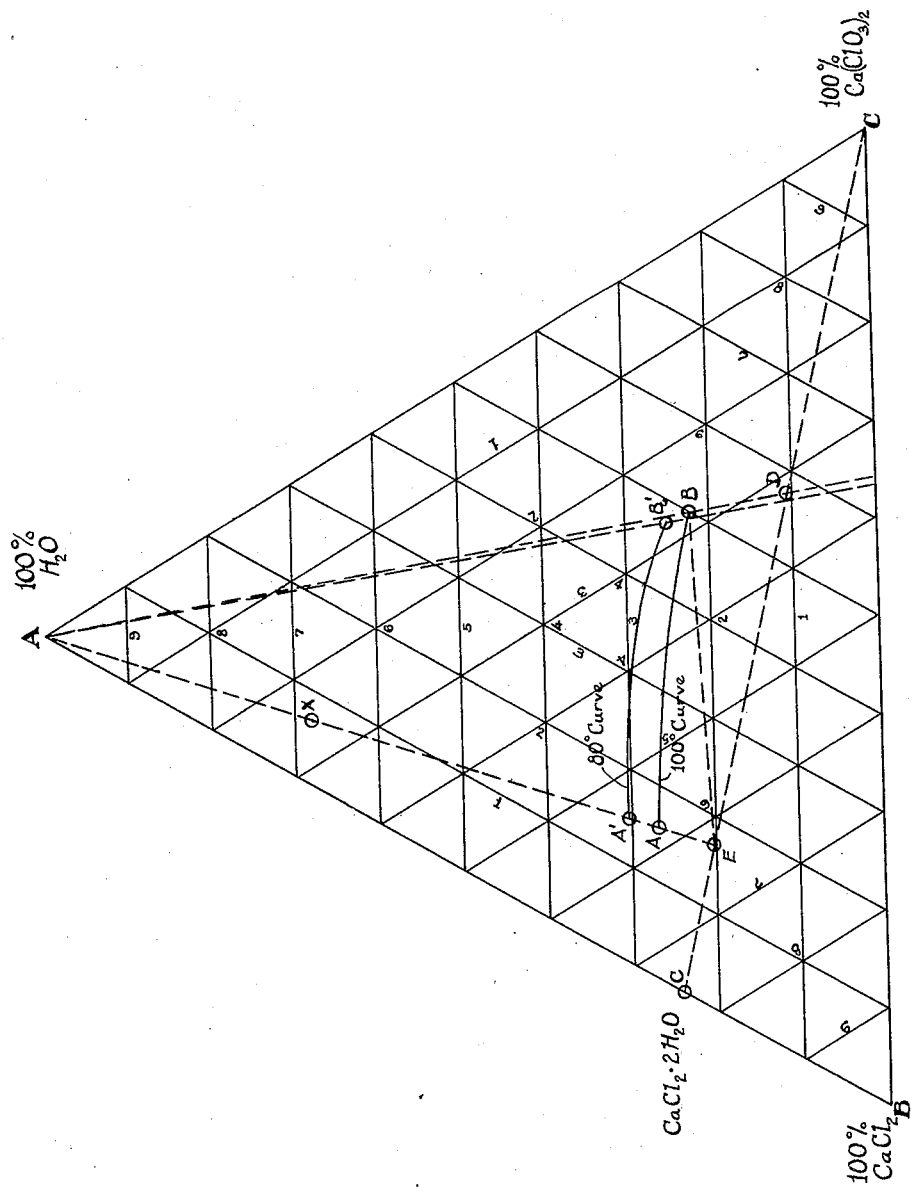
INVENTOR
BY Sheldon B. Heath
Thomas Griswold, Jr.
ATTORNEY Patented Apr. 19, 1932

1,854,405

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

PREPARATION OF A MIXED CALCIUM CHLORIDE-CALCIUM CHLORATE PRODUCT

Application filed March 7, 1930. Serial No. 433,853.

This invention relates to the preparation of a product comprising a mixture of crystals of calcium chloride dihydrate, $CaCl_2.2H_2O$, and anhydrous calcium chlorate, $Ca(ClO_3)_2$, such mixed product having particular value for use in herbicidal preparations and the like.

A process for the separation of calcium chlorate as the dihydrate, $Ca(ClO_3)_2.2H_2O$, by direct crystallization from a solution thereof containing calcium chloride is described in my co-pending application Serial No. 424,493 filed January 30, 1930, such process being generally applicable to mixed solutions of the two salts wherein the molecular ratio of chloride to chlorate is greater than $$\frac{1}{1}.$$

In the aforesaid process the mixed salt solution is first concentrated to salt out a portion of the chloride, if necessary, as $CaCl_2.2H_2O$ and leave a residual solution in which the molecular ratio of chloride to chlorate is between $$\frac{2}{1} \text{ and } \frac{1}{1}.$$

The concentrated solution is then diluted, if necessary, and cooled to a temperature below about 60° to 67° C., the transition point range of $Ca(ClO_3)_2.2H_2O$ to anhydrous $Ca(ClO_3)_2$ in the presence of a liquid phase containing calcium chloride, to crystallize out the chlorate as $Ca(ClO_3)_2.2H_2O$. If, instead of diluting and cooling the concentrated solution to crystallize out the chlorate, the solution is further concentrated by evaporation, a mixed product consisting of an approximately equi-molecular mixture of $CaCl_2.2H_2O$ and $Ca(ClO_3)_2$ may be salted out directly, while the boiling mother liquor maintains a constant composition at any stated temperature until evaporated to dryness. Furthermore, if a solution containing calcium chloride and calcium chlorate in any proportion is introduced into such boiling mother liquor of constant composition at a rate such that the water evaporated and removed as water of crystallization in the precipitated crystals balances that so introduced, a mixture of crystals of such chloride and chlorate will be salted out having the same chloride-chlorate ratio as existed in the added solution. In case the added water is insufficient to compensate for that evaporated, crystals of the equilibrium mixture will also be precipitated at the same time. By suitably controlling conditions, however, it is possible to prepare any desired mixture of $CaCl_2.2H_2O$ and $Ca(ClO_3)_2$ crystals by direct crystallization methods. For certain purposes such mixed product is especially to be desired, as in the preparation of herbicidal compositions, and it is an object of the present invention to provide a method whereby the aforesaid mixed product may be prepared in a particularly expeditious manner. The invention, then, consists of the method hereinafter fully described and pointed out in the claims, the annexed drawing and following description setting forth but a few of the various ways in which the principle of the invention may be used.

In said annexed drawing:—

The single figure is a chart showing curves for the composition of mixed solutions of calcium chloride and calcium chlorate saturated with respect to $CaCl_2.2H_2O$ at the temperatures 80° and 100° C., respectively.

As an illustrative example of the operation of my improved method, I may prepare a crystallized mixture of $CaCl_2.2H_2O$ and $Ca(ClO_3)_2$ from a solution of calcium chloride and calcium chloride prepared according to the known method of absorbing chlorine in milk of lime and having the following analysis:—

|  | Per cent |
|---|---|
| $CaCl_2$ | 25.1 |
| $Ca(ClO_3)_2$ | 6.8 |
| $Ca(ClO)_2$ | 0.1 |
| $H_2O$ | 68.0 |
|  | 100.0 |

The composition of this solution is represented by the point X on the drawing. The feed solution is first warmed and subjected to a preliminary treatment with a reducing agent, e. g. sulphur dioxide or sodium bisulphite, to remove the small amount of hypochlorite, and the treated solution is filtered. The clear filtrate is then concentrated by evaporation preferably under reduced pressure at a moderate temperature, for instance, 100° C. As water is removed by evaporation the composition of the solution changes continuously along line XA until a composition represented by point A is reached whereat the solution becomes saturated with respect to $CaCl_2.2H_2O$. Continued evaporation is then accompanied by salting out of crystals of $CaCl_2.2H_2O$, the composition of the solution following along curve AB until at point B the solution becomes saturated with respect to $Ca(ClO_3)_2$ and crystals of the latter salt begin to be precipitated together with the chloride crystals. Further evaporation beyond this point results in no further change in the composition of the solution, and both salts are crystallized out together in the proportion represented by the equilibrium point B, the ratio of chloride to chlorate being $$\frac{28}{50}$$

by weight and the water content of the solution being 22 per cent. The molecular ratio of chloride to chlorate corresponding thereto is seen to be very nearly $$\frac{1}{1}.$$

The composition of the crystal mixture salted out is found by drawing a straight line from the $H_2O$ vertex through point B, and another line from the $Ca(ClO_3)_2$ vertex to point C representing the composition of $CaCl_2.2H_2O$, and finding the intersection of the two lines, i. e. point D, which corresponds to 32 per cent $CaCl_2$, 57.5 per cent $Ca(ClO_3)_2$ and 10.5 per cent $H_2O$.

If the concentration is carried out at 80° C. the solution composition during the salting out of $CaCl_2.2H_2O$ is shown by curve A' B', point B' representing the composition of the equilibrium mixture. The mixed salt product obtained by crystallizing at 80° C. therefore contains a slightly higher ratio of chloride to chlorate. Still lower temperatures down to about 60° C. may be employed, if desired, but with somewhat less advantage owing to the higher vacuum required for the evaporation. Likewise higher temperatures may be employed for the evaporation and salting out, up to the atmospheric boiling point of the saturated solution, but at such higher temperatures the corrosive action of the strong salt solutions upon the equipment constructed of usual materials becomes appreciable. While the temperatures of 100° and 80° C. have been selected for the purpose of illustration and are not to be construed as implying any limitation upon the invention, still the range of temperatures comprised roughly between those limits affords the most convenient operating conditions, in that the concentration may be carried out under reduced pressures such as are easily attainable with usual equipment and the metallic surfaces exposed to the strong salt solution are not subjected to severely corrosive attack.

Instead of continuing the evaporation of a mother liquor of composition B or the equivalent, however, until most or all of the solution is boiled off to obtain a crystal product of composition D, which necessarily involves a batch or intermittent mode of operation, the process may be adapted to continuous operation by boiling a body of mother liquor, for instance, of equilibrium composition B at a convenient temperature, e. g. 100° C., and continuously introducing thereto further amounts of solution of any available composition, such as represented by X, at a sufficient rate that the vaporizable water added is equal to that boiled off. Thereby a mixture of crystals of $CaCl_2.2H_2O$ and $Ca(ClO_3)_2$ would be continuously salted out in the same proportion as present in the original solution, while the boiling mother liquor would be maintained at substantially constant volume. The composition of the crystal mixture so obtained is represented by the point E, which is determined by drawing a line from the $H_2O$ vertex through point X to the intersection with line DC. Under properly controlled conditions an uninterrupted production of the crystal mixture may be carried on in this way. The precipitated crystals may be removed and filtered while hot from the mother liquor. When the filtered crystals are cooled to a temperature below about 60° C. the slight amount of mother liquor adhering to the surfaces thereof is absorbed by rehydration of anyhydrous $Ca(ClO_3)_2$ to the dihydrated salt $Ca(ClO_3)_2.2H_2O$, so that a sensibly dry, granular mass is obtained which possesses free flowing and non-caking characteristics.

Similarly a crystalline mixed calcium chloride-calcium chlorate product of any desired composition may be prepared by employing as a feed solution a solution of the two salts in the same ratio. Likewise the operation may be carried out at any desired temperature between about 60° C. and the atmospheric boiling point of a calcium chloride-calcium chlorate solution of equilibrium composition corresponding to the temperature chosen. The principle governing the foregoing method of operation remains the same in any case, regardless of the composition of the feed solution or of the temperature of evaporation within the limits stated above. A calcium chloride-calcium chlorate solution of equilibrium concentration, as referred to hereinbefore and in the appended claims, is a solution saturated with respect to $CaCl_2.2H_2O$ and $Ca(ClO_3)_2$. The actual ratio of chloride to chlorate therein varies somewhat with the temperature, but in general does not deviate greatly from an equimolecular ratio.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of preparing a mixed calcium chloride-calcium chlorate product which comprises evaporating an approximately equimolecular solution thereof at a temperature above 60° C. to crystallize out a mixture of $CaCl_2.2H_2O$ and $Ca(ClO_3)_2$.

2. The method of preparing a mixed calcium chloride-calcium chlorate product which comprises concentrating an aqueous solution thereof wherein the ratio of chloride to chlorate is greater than $$\frac{1}{1}$$

to crystallize out $CaCl_2.2H_2O$ and leave a solution wherein said ratio is approximately $$\frac{1}{1},$$

separating the crystals and evaporating the residual solution at a temperature above 60° C. to crystallize out a mixture of $CaCl_2.2H_2O$ and $Ca(ClO_3)_2$ in substantially the same ratio.

3. The method of preparing a mixed calcium chloride-calcium chlorate product which comprises concentrating by evaporation at a temperature between about 80° and 100° C. an aqueous solution thereof wherein the ratio of chloride to chlorate is greater than $$\frac{1}{1}$$

to crystallize out $CaCl_2.2H_2O$ and leave a solution wherein said ratio is approximately $$\frac{1}{1},$$

separating the crystals and further evaporating the residual solution at the stated temperature to crystallize out a mixture of $CaCl_2.2H_2O$ and $Ca(ClO_3)_2$ in substantially the same ratio.

4. The method of preparing a mixed calcium chloride-calcium chlorate product which comprises boiling a solution thereof of equilibrium concentration at a temperature above 60° C. and adding thereto a solution of the two salts at such rate as to maintain the volume of the boiling solution substantially constant, whereby a mixture of $CaCl_2.2H_2O$ and $Ca(ClO_3)_2$ is crystallized out in substantially the same proportion as present in such added solution.

5. The method of preparing a mixed calcium chloride-calcium chlorate product which comprises concentrating an aqueous solution thereof wherein the ratio of chloride to chlorate is greater than $$\frac{1}{1}$$

to crystallize out $CaCl_2.2H_2O$ and leave a mother liquor wherein said ratio is approximately $$\frac{1}{1},$$

continuing evaporation of the mother liquor at a temperature above 60° C., adding thereto a solution of the two salts at such rate as to maintain a substantially constant volume, whereby a mixture of $CaCl_2.2H_2O$ and $Ca(ClO_3)_2$ is crystallized out in substantially the same proportion as present in such added solution, and separating the crystals from the mother liquor.

6. The method of preparing a mixed calcium chloride-calcium chlorate product which comprises boiling a solution thereof, wherein the ratio of chloride to chlorate is approximately $$\frac{1}{1},$$

at a temperature between about 80° and 100° C. and continuously adding thereto a solution of the two salts at such rate as to maintain a substantially constant volume, whereby a mixture of $CaCl_2.2H_2O$ and $Ca(ClO_3)_2$ is crystallized out in substantially the same proportion as present in such added solution.

7. The method of preparing a mixed calcium chloride-calcium chlorate product which comprises concentrating by evaporating at a temperature between about 80° and 100° C. an aqueous solution thereof, wherein the ratio of chloride to chlorate is greater than $$\frac{1}{1},$$

to crystallize out $CaCl_2.2H_2O$ and leave a mother liquor wherein said ratio is approximately $$\frac{1}{1},$$

continuing evaporation of the mother liquor at such temperature, adding thereto a solution of the two salts at such rate as to maintain a substantially constant volume, whereby a mixture of $CaCl_2.2H_2O$ and $Ca(ClO_3)_2$ is crystallized out in substantially the same proportion as in such added solution, and separating the crystals from the mother liquor.

Signed by me this 4th day of March, 1930.

SHELDON B. HEATH.

CERTIFICATE OF CORRECTION.

Patent No. 1,854,405.  Granted April 19, 1932, to

SHELDON B. HEATH.

It is hereby certified that error appears in the printed specification of the above numbered patent requiring correction as follows: Page 1, line 85, for the word "chloride" read chlorate, and line 86, for "of" read by; and that the said Letters Patent should be read with these corrections therein that the same may conform to the record of the case in the Patent Office.

Signed and sealed this 21st day of June, A. D. 1932.

(Seal)

M. J. Moore,
Acting Commissioner of Patents.